United States Patent [19]

Samuel

[11] Patent Number: 4,711,394
[45] Date of Patent: Dec. 8, 1987

[54] MULTIPLE-UNIT HVAC ENERGY MANAGEMENT SYSTEM

[76] Inventor: Glenn W. Samuel, 557 Crest Ave., Elk Grove, Ill. 60007

[21] Appl. No.: 19,417

[22] Filed: Feb. 26, 1987

[51] Int. Cl.$^4$ ............................................. F24F 13/06
[52] U.S. Cl. ........................................ 236/49; 165/22
[58] Field of Search ................... 236/49 D, 1 B, 91 R; 62/175; 165/22, 28

[56] References Cited

U.S. PATENT DOCUMENTS

| | | | |
|---|---|---|---|
| 2,223,287 | 11/1940 | Mingsland | 236/49 D X |
| 4,178,764 | 12/1979 | Rowe | 62/175 X |
| 4,406,397 | 9/1983 | Kiwata et al. | 236/1 B |
| 4,543,796 | 10/1985 | Han et al. | 236/49 D X |

*Primary Examiner*—William E. Tapolcai
*Attorney, Agent, or Firm*—Charles F. Lind

[57] ABSTRACT

The disclosed energy management system pairs zones and respective HVAC units for the zones. In addition to each zone having conventional primary supply and return air diffusers connected to its HVAC unit, there is an additional diffuser in each zone connected to the HVAC unit of the paired zone. A valve controls the air flow from each HVAC unit: to only the primary diffusers for its zone; or to both the primary diffusers for its zone and the additional diffusers for the other paired zone. Control stats in each zone determines the HVAC demand for that zone; and responsive to the first demand from either zone, operate the HVAC unit for that zone. Simultaneously, the energy management control locks out the other HVAC unit to prevent its operation. Upon a concurrent demand from the paired zone, the valve of the first activated HVAC unit shifts, to divert some of its conditioned air to its paired zone. A thermostat sensing outdoor temperatures, allows the sytem to function only when the outdoor temperature is within a reasonably moderate range, approximately midway between the zone comfort temperature, such as 70° F., and the lowest and/or highest design temperatures for the HVAC units.

12 Claims, 5 Drawing Figures

FIG. 4 ately peak utility de-
MULTIPLE-UNIT HVAC ENERGY MANAGEMENT SYSTEM

FIELD OF THE INVENTION

This invention relates to multiple-unit heating, ventilating, and air conditioning systems, used for conditioning separate zones.

BACKGROUND OF THE INVENTION

A heating, ventilating and air conditioning system (hereinafter also being referred to as HVAC) may consist of equipment to condition air as needed (to heat, cool, dry, moisten or purify it, etc.), and then to force the conditioned air to a zone, in order to satisfy demand called for in that zone. Each system may include at least two air-flow diffusers in the zone, one for the discharge of air to the zone and one for the return of air from the zone. Ducts may connect each diffuser to the HVAC equipment located remotely of the zone. A sensor, such as a thermostat for temperature, may detect demand in the zone, to operate the HVAC unit for such zone responsive to such demand.

Certain HVAC systems may have multiple units, for conditioning multiple zones; each unit being the duplicate of the other. Each unit would primarily be responsible for its one zone, and would be cycled on and off responsive to the demand of its zone.

Under many outdoor ambient temperatures, the design capacity of the HVAC unit far exceeds the conditioning output needed to satisfy the demand of the zone. Under such operating conditions, each unit will be cycled on and off, sometimes quite frequently and/or for only short durations, responsive to the instantaneous zone demands.

Operating HVAC equipment under frequent short cycles is hard on the equipment, possibly leading to more frequent maintenance demands and/or breakdowns than equipment run over sustained periods. Moreover, the efficiency drops off, as the equipment itself initially must be run merely to bring its own hardware to operating temperatures, at the start of the operating cycle; and the energies of the cycle may merely be dissipated without reaching the conditioned zone, at the end of the cycle. Reduced efficiency means more total overall operating hours for such equipment, to yield the same needed thermal output.

Additionally, with a multiple unit HVAC system, should two or more of the HVAC units come on simultaneously, the allowable instanteous peak utility demand, set by the local utility company, may be exceeded . . . to result then in a surcharge being imposed on the utility billing rate. Load sheading controls are available to avoid this; but such generally are costly and complicated, and utilize high-tech solid state systems and/or dedicated computers. Many users now have only standard HVAC equipment of a hands-on familiarity, and may conscientiously or unconscientiously avoid that initial step into the complexities and unknowns of the high-tech world . . . including the known elevated installation and service charges.

SUMMARY OF THE INVENTION

The present invention provides an automatic change-over air flow design and control for energy management of a multiple-zone, multiple-unit HVAC system, the invention utilizing standard hands-on equipment while yet reducing frequent or rapid cycling of such equipment, to reduce the operating costs, wear and service requirements thereof, and/or to otherwise improve the efficiency and operating life of such equipment.

The present energy management system pairs HVAC units and their zones; each zone having first and second supply diffusers for discharging conditioned air from its HVAC unit, and a return diffuser for returning air back to its HVAC unit; and each zone also having stat means in each zone for detecting a demand for conditioned air, and for operating the zone HVAC unit responsive thereto. An additional supply diffuser is provided in each zone; and means connect such additional diffuser in each zone with the HVAC unit for the other zone, including having valve means to open and close air flow selectively from the HVAC unit to the other zone. Responsive to a demand for conditioned air in the first of either paired zone, a control operates the HVAC unit for such first zone, and locks out the HVAC for the other zone. Responsive then to a subsequent and concurrent demand for conditioned air in the other zone, the control opens the valve means of the operating HVAC unit, for diverting some of the conditioned air flow from such unit to the other zone. An ambient thermostat that detects ambient outdoor temperatures provides for operation of the energy management system only during a predetermined range of moderate outdoor temperatures.

DETAILED DESCRIPTION OF AN ILLUSTRATED EMBODIMENT

Figure 1:
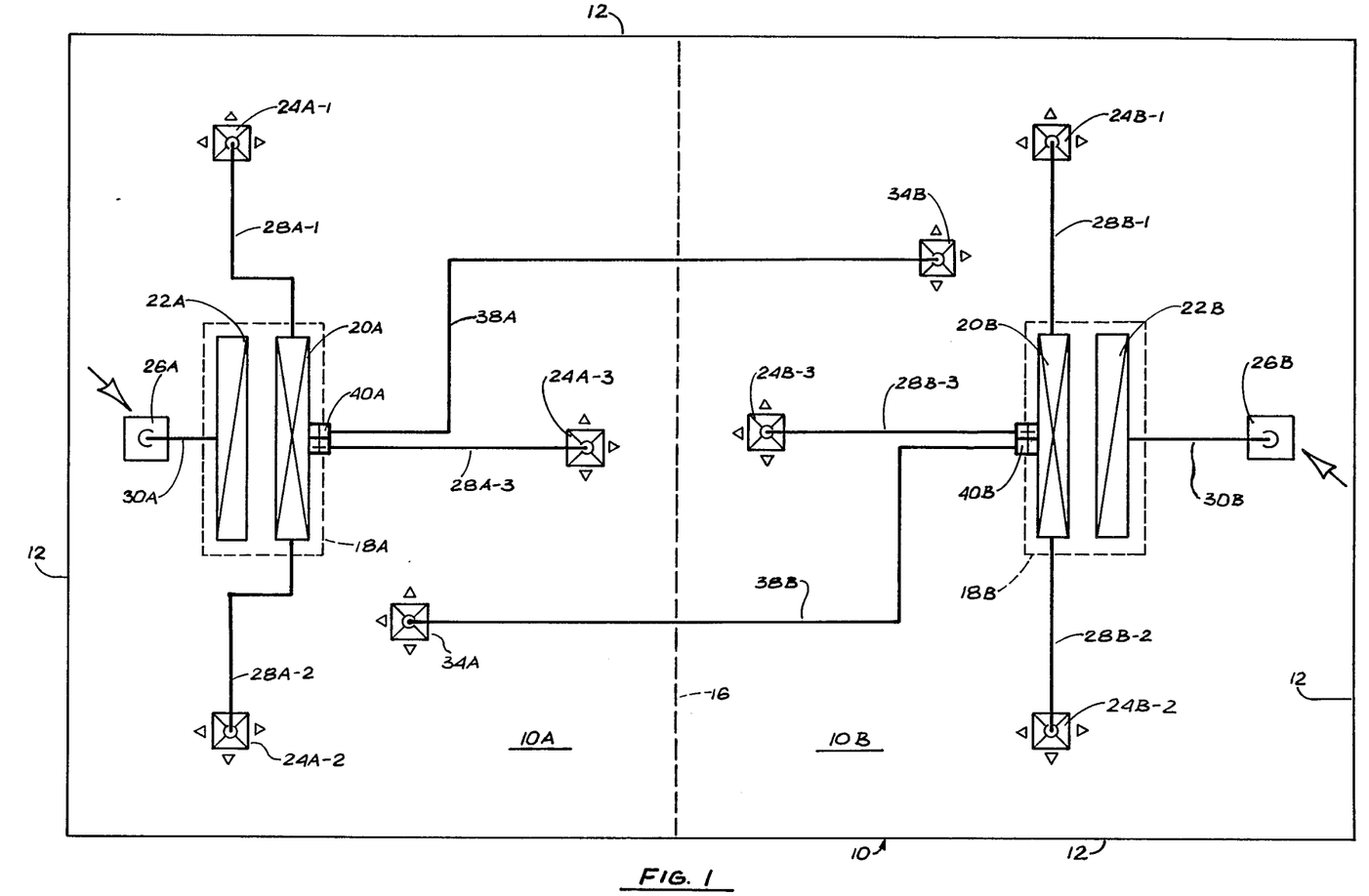
FIG. 1 is a top plan view, somewhat in schematic, of one embodiment of the subject energy management invention incorporated in a paired multiple zone, multiple-unit HVAC system.
Figure 2:
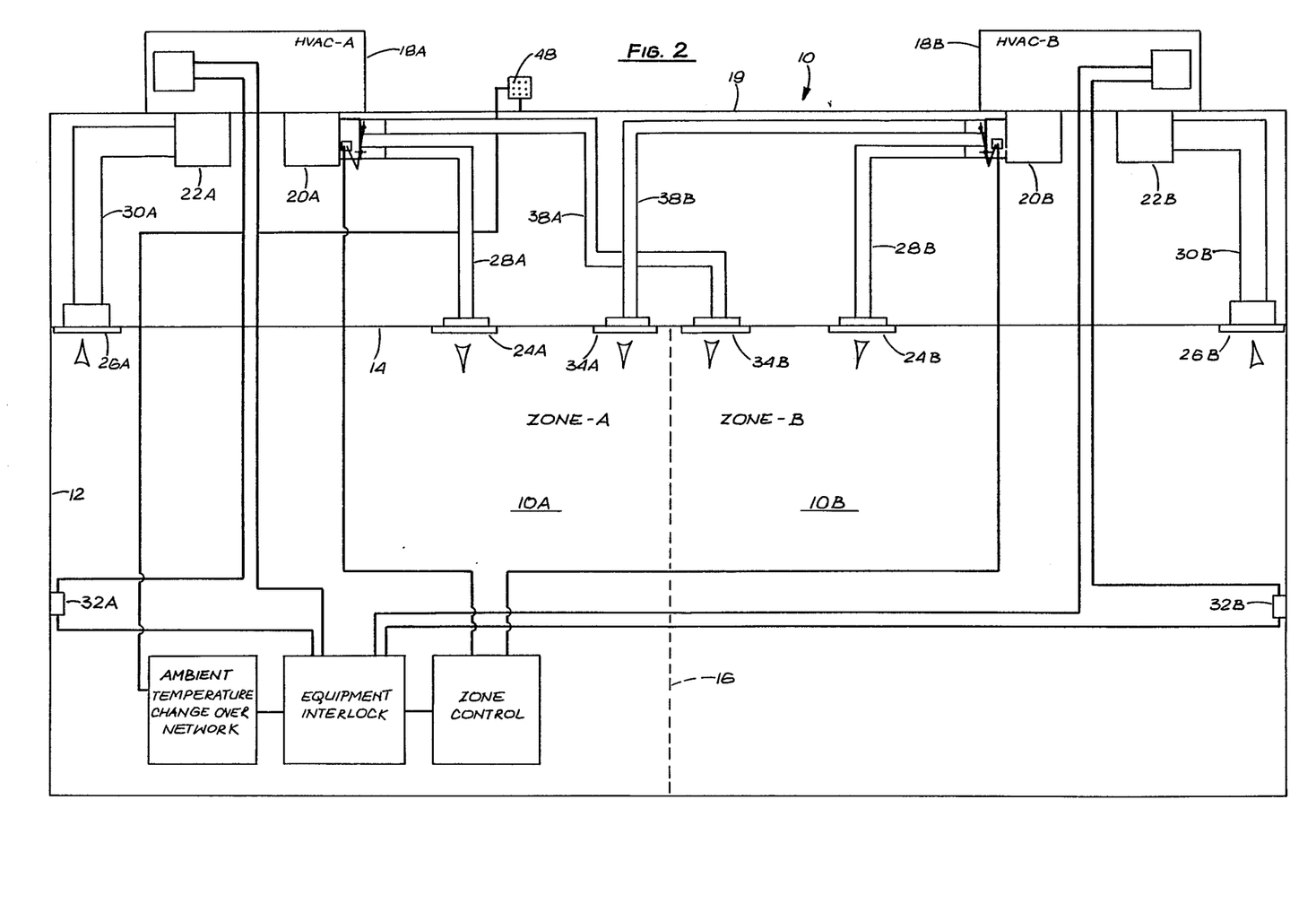
FIG. 2 is an elevational view of FIG. 1, again somewhat in schematic, illustrating the HVAC units with the supply and return air flows thereof; and illustrating also a block diagram control used in the system.

FIGS. 1 and 2 illustrate schematically a building enclosure 10 defined within walls 12 and under drop ceiling 14. For this disclosure, such enclosure 10 is considered sufficiently large for heating and/or cooling purposes, that it comprises several laterally separated but interconnected zones 10A and 10B, located (for reference purposes only) on opposite sides of dotted line 16. This would be typical of commercial establishments, including offices, restaurants or the like. Two HVAC units 18A and 18B are also illustrated for the enclosure 10, the units generally being mounted on the roof 19 of the building. The HVAC unit 18A is designed for primarily conditioning zone 10A, and HVAC unit 18B is designed for primarily conditioning zone 10B.

Each HVAC unit 18A (and 18B) has a separate supply plenum 20A (and 20B), and a separate return air plenum 22A (and 22B); and each zone 10A (and 10B) has several supply air diffusers 24A (and 24B) identified specifically as 24A-1, 24A-2 and 24A-3 (and 24B-1, 24B-2 and 24B-3) in FIG. 2, and return air diffusers 26A (and 26B). Separate supply air ducts 28A (and 28B), identified specifically as 28A-1, 28A-2 and 28A-3 (and 28B-1, 28B-2 and 28B-3 in FIG. 2), connect between the supply air plenum 20A (and 20B) and the supply air diffusers 24A and 24B; and return air ducts 30A (and 30B) connect between the return air plenum 22A (and 22B) and the return air diffuser 26A (and 26B). The plenums and ducts would commonly be under the roof 19 within the building, but hidden above the drop ceiling 14.

A thermostat 32A (and 32B) responds to the temperature in each zone 10A (and 10B) to operate the HVAC unit 18A (and 18B) for each zone.

The energy management invention, to be disclosed, pairs up the adjacent zones 10A and 10B, with the respective HVAC units 18A and 18B for the zones, to divert air flow from either unit to the opposite zone. An additional or secondary supply air diffuser 34A (and 34B) is located in each zone 10A (and 10B); and an additional or secondary duct 38A (and 38B) connects the diffuser to the HVAC unit supply air plenum 20B (and 20A) normally used for the other paired zone 10B (and 10A).

Figure 3:
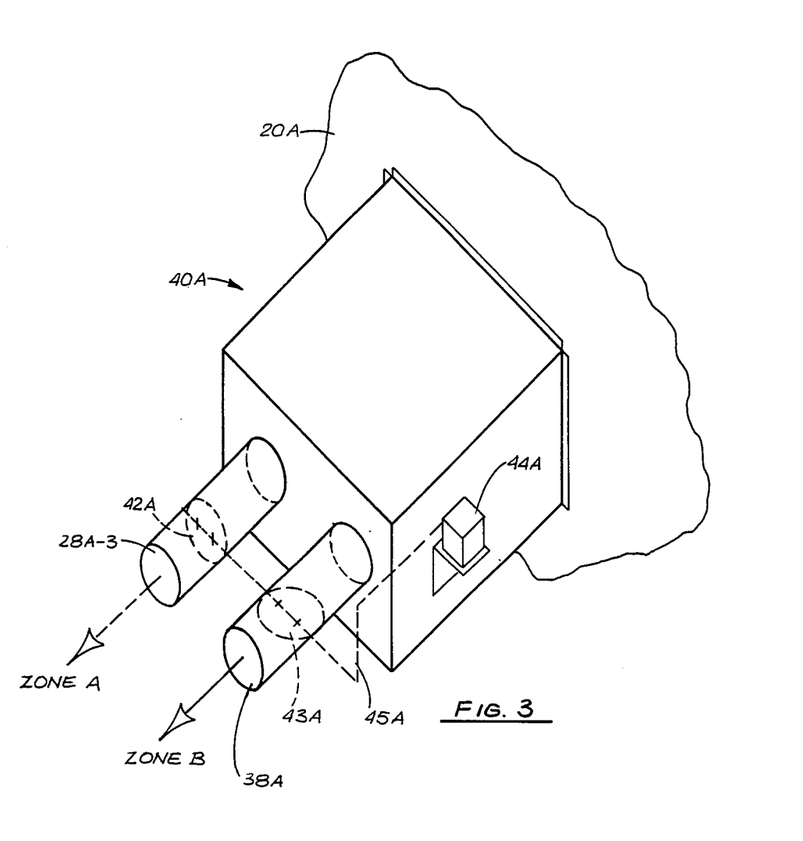
FIG. 3 is an enlarged perspective view of one HVAC outlet plenum, and illustrating valve means used to divert the conditioned air in the system.

As is illustrated in FIGS. 1 and 2, a valve 40A (and 40B) is connected off each respective supply air plenum 20A (and 20B), between the plenum and the primary duct 28A-3 (and 28B-3) and the secondary duct 38A (and 38B). The valve 40A is illustrated in FIG. 3, being typical of either valve 40A or 40B. The valve 40A (and 40B) operates with separate butterfly dampers 42A and 43A in the respective ducts 28A-3 and 38A (and likewise in ducts 28B-3 and 38B), to open one of the ducts 28A-3 (and 28B-3) while closing the other of the ducts 38A (and 38B); and vice-versa. An actuator or motor 44A (and 44B in FIG. 4) powers the dampers 42A and 43A, via linkage 45A, to and between the respective operating positions.

Under normal HVAC operation, the valve 40A (and 40B) is positioned to open the primary duct 28A-3 (and 28B-3) and close the secondary duct 38A (and 38B), to deliver air from the respective supply air plenum 20A (and 20B) to only the primary diffuser 24A-3 (or 24B-3) of the same zone 10A (or 10B). During this mode of operation, no air flow is delivered to the secondary diffuser 34B (and 34A) of the paired other zone 10B (or 10A).

Under the energy management mode of operation, the energized actuator motor 44A (or 44B) shifts the valve 40A (or 40B) to close its primary duct 28A-3 (or 28B-3) to zone 10A (or 10B), and open its secondary duct 38A (or 38B) to the other zone 10B (or 10A). Part of the air flow from the operating HVAC unit 18A (or 18B) will thus not be directed to its zone 10A (or 10B), but instead will be diverted to the paired other zone 10B (or 10A).

Figure 4:
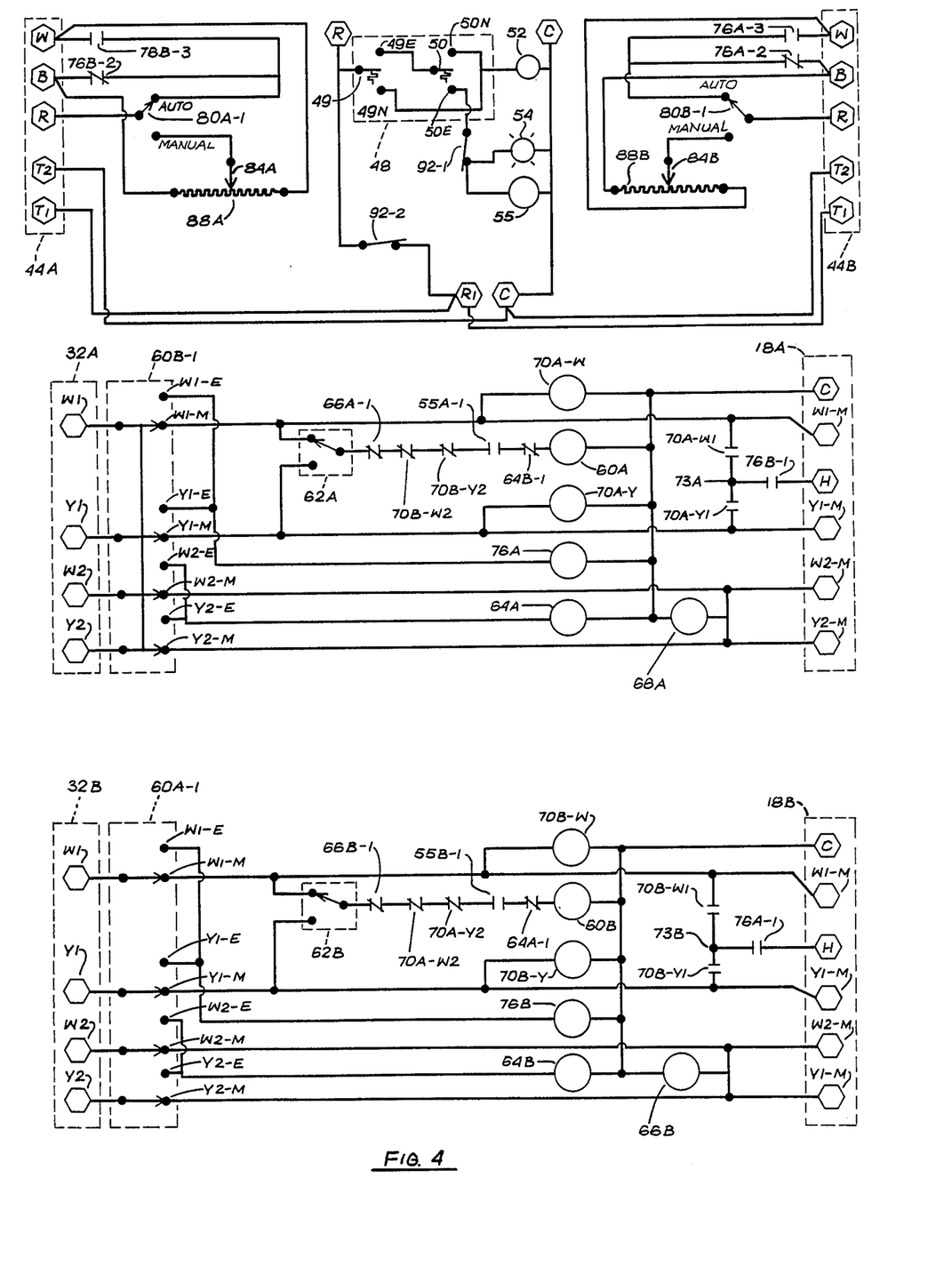
FIG. 4 is a schematic diagram of the electrical control used in the system.
Figure 5:
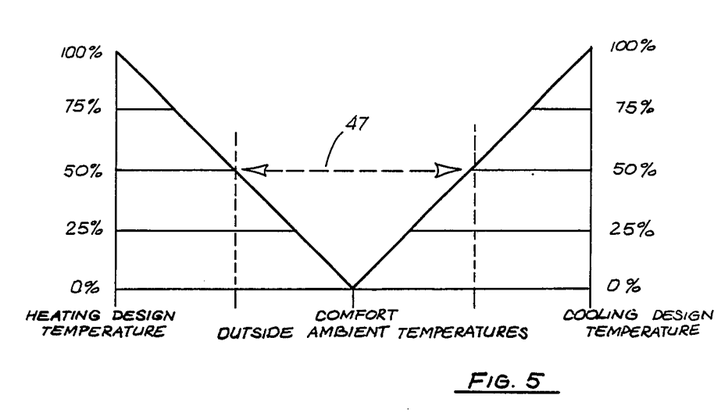
FIG. 5 is chart illustrating the temperature range appropriate for operation of the disclosed energy management system.

The HVAC energy management system disclosed herein is designed to function only during moderate temperature conditions, within the approximate mid-range of capacity of the HVAC units, as indicated by arrow 47 in the design capacity versus outdoor temperature chart in FIG. 5. Ambient thermostat 48 (see FIGS. 2 and 4) is located outside of the enclosure 10, such as near the HVAC unit 18A (or 18B), to sense when the outdoor temperature is within this predetermined range 47. At outdoor temperatures beyond this range 47, either hotter or colder, the conventional heating and cooling controls of the HVAC units 18A and 18B for the enclosure 10 will function normally, determined by the zone thermostats 32A and 32B, and the energy management system will be inoperative.

The illustrated ambient thermostat 48 is in circuit between the electrically hot terminal R and the common C; and has a thermally responsive element 49 with two contacts (49N and 49E), and a thermally responsive element 50 with two contacts (50N and 50E). Each thermally responsive element 49 (and 50) is of conventional snap acting design, to be against either contact 49N or 49E (and 50N or 50E). The contacts 49N and 50N connect through normal operation indicator 52 to the common terminal C. The contact 49E connects to thermally responsive element 50, and contact 50E connects through energy management operation indicator 54, and ambient temperature relay 55, to the common terminal C. The ambient temperature relay 55 operates normally open contacts 55A-1 and 55B-1, located in the respective control for the zone 10A or 10B.

Each room thermostat 32A (and 32B) may be conventional, having a heat terminal W1 that is hot when there is a demand for heat; and optionally having a second heat terminal W2 that is also hot a few degrees cooler, effective then if used to activate a second stage of a two-stage heating system on the HVAC. Each room thermostat 32A (and 32B) may further have a cool terminal Y1 that is hot when there is a demand for cooling; and optionally may have a second cool terminal Y2 that is also hot a few degrees warmer, effective then if used to activate a second stage of a two-stage cooling system on the HVAC.

The heat and cool terminals (W1 and W2, and Y1 and Y2) of the zone thermostats 32A and 32B normally are connected directly in circuit to terminals (W1-M and W2-M, and Y1-M and Y2-M) on the HVAC units 18A (and 18B. Each HVAC unit terminal conventionally will be directed to the heating or cooling hardware or relay component (not shown), of the HVAC unit 18A (and (18B), that is to be energized to effect actual heating or cooling.

In the control illustrated in FIG. 4, switch 60B-1 (and 60A-1) is connected in the lines between the W1, Y1, W2 and Y2 terminals of the zone thermostats 32A (and 32B) and the W1-M, Y1-M, W2-M and W2-M terminals of the HVAC units 18A and 18B; each switch being controlled by a lockout relay 60B (and 60A) connected in the control normally associated with its zone 10B and 10A, but itself being in the HVAC control of the paired other zone 10A (and 10B).

Each switch 60B-1 (and 60A-1) has four common contacts connected respectively to the four thermostat terminals W1, W2, Y1 and Y2 of the enclosure thermostat 32A (and 32B), and has four stationary contacts W1-M, W2-M, Y1-M and Y2-M connected respectively to the four terminals W1-M, W2-M, Y1-M and Y2-M of the HVAC unit 18A (and 18B). The switch 60B-1 (and 60A-1) is normally biased to the illustrated position, by springs or other conventional means, where the common contacts close against the stationary contacts W1-M, W2-M, Y1-M and Y2-M; and is shifted by the energized lockout relay 60B (and 60A) to the opposite position, where the common contacts close against stationary contacts W1-E, Y1-E, W2-E and Y2-E.

A two-way selector switch 62A (and 62B) is connected off the W1-M heat and Y1-M cool contacts, to provide controlled operation of the HVAC unit 18A (and 18B), in either the heating or cooling modes. The common of the selector switch 62A (and 62B) is connected through relay 60A (and 60B), in series with the normally open ambient temperature relay contacts 55A-1 (and 55B-1); normally closed time delay relay contacts 64B-1 (and 64A-1); normally closed time delay relay contacts 66A-1 (and 66B-1); and the normally closed contacts 70B-W2 and 70B-Y2 (and 70A-W2 and 70A-Y2) of a holding relay 70A-W (and 70B-W).

The holding relay 70A-W (and 70B-W) is connected between terminal W1-M of the HVAC unit 18A (and 18B) and the common terminal C; its normally open contacts 70A-W1 (and 70B-W1) being connected between the same terminal and junction 73A (and 73B); and its normally closed contacts 70A-W2 (and 70B-W2) being connected, as just noted, in series with the normally open ambient temperature contacts 55B-1 (and 55B-1) and relay 60A (and 60B), in the other zone control.

A damper relay 76A (and 76B) is connected between the terminals W1-E and Y1-E of the switch 60B-1 (and 60A-1), and the common terminal C; and its normally open contacts 76A-1 (and 76B-1) are connected between the junction (73B or 73A) and the hot terminal H. However, note again that the relay 76A in the zone A control operates to shift the control contacts 76A-1 located in the B zone control; and vice-versa with respect to the relay 76B and its contacts 76B-1.

Time delay relay 64A (and 64B) is connected between the contacts W2-E and Y2-E of the switch 60B-1 in the zone A control (and 60A-1 in the zone B control), and the common terminal C; and its normally closed contacts 64A-1 (and 64B-1), as just mentioned, are connected in the series connection with the normally open ambient temperature contacts 55B-1 (and 55A-1) and the relay 60B (and 60A) previously mentioned. However, note again that the relay 64A in the zone A control operates to shift the contacts 64A-1 located in the B zone control; and vice-versa with respect to the relay 64B and its contacts 64B-1.

Time delay relay 66A (and 66B) is connected between the contacts W2-M and Y2-M of the switch 60B-1 in the zone A control (and 60A-1 in the zone B control), and the common terminal C; and its normally closed contacts 66A-1 (and 66B-1), as just mentioned, are connected in the series connection with the normally open ambient temperature contacts 55A-1 (and 55B-1) and the relay 60A (and 60B) previously mentioned.

The control to open or close the diverter valve means 40A (and 40B) on each HVAC unit 18A (and 18B), includes reversible actuator motor 44A (and 44B), having input terminals W and B that when energized respectively rotate the motor in opposite directions. The normally closed relay contacts 76B-2 (and 76A-2) are in a circuit loop via the "auto" contact of switch 80A-1 (and 80B-1) between the hot terminal R and the B motor terminal, to drive the motor 44A (or 44B) in a direction to close the divert damper 43A (and 43B) and open the primary flow damper 42A and (42B).

The normally open contacts 76B-3 (and 76A-3) are in a circuit loop via the "auto" contact of switch 80A-1 (and 80B-1) between the hot terminal R and the W motor terminal, to drive the motor 44A (or 44B) in a direction to open the divert damper 43A (and 43B) and close the primary flow damper 42A and (42B).

A manual control is also provided for opening or closing the valve 40A (and 40B), upon shifting the switch 80A-1 (and 80B-1) to the "manual" position; whereupon a circuit is completed through wipper contact 84A (and 84B) to adjusted positions along resister 88A (and 88B). This allows for manual setting of the valves, such as to effect air flow diversion from one HVAC unit to the paired zone; should a malfunction in the HVAC unit for the paired zone occur, or as might otherwise be necessary or desirable to open or close the valves.

A manual switch may be used to override the energy management system at any time; having contacts 92-1 in a series connection with the ambient temperature relay 55, and having contacts 92-2 in the circuit between the hot terminal R and the terminal R1.

SUMMARY OF THE OPERATION

The position of the heat/cool selector switches 62A and 62B will determine the operation of the HVAC units 18A and 18B, for either the heating mode or the cooling mode; and for this energy management system to function, both switches must be set in the same mode. In point of fact, such switches 62A and 62B would typically be part of a common switch assembly, to shift both switches simultaneously. The ambient thermostat 48 will determine if the outside temperature is within or beyond the selected range of operation of the energy management system, as indicated by the arrow 47 in FIG. 5.

If the outside temperature is beyond the selected range, either colder or hotter, the HVAC units 18A and 18B will operate normally, responding to the zone thermostats 32A and 32B. Thus, either HVAC unit will be cycled on and off, responsive to the demand of its individual zone 10A and 10B; and the energy management system disclosed herein will be inoperative.

If the outside temperature is within the preset range, indicated by the arrow 47 in FIG. 5, the energy management system will be in a condition to function, for either heating or cooling the zones 10A and 10B.

The range 47 of outside temperatures that will typically be selected for any given HVAC units, is the approximate mid range, for heating and for cooling, between the low end or heating and the high end or cooling design temperatures of the units. This will vary, depending on the location in the country and the anticipated heat demands.

For a climate such as Madison, Wis., the cold end or heating design temperature may be $-10°$ F. and the hot end or cooling design temperature may be 95° F.; while the design comfort temperature may be 70° F. The cold end operating temperature of the energy management system may be at or a degree or two above the average of the cold end and comfort design temperatures, such as possibly 30°–32° F.; while the hot end operating temperatures of the energy management system may be at or a degree or two below the average of the comfort and cooling design temperatures, such as 80°–82° F. Within such a moderate operating temperature range, the design capacity of either HVAC unit should be sufficient to satisfy the thermal demands, for either heating or cooling, of both enclosure zones.

In the ambient thermostat 48, the thermally responsive element 49 may be set to close against contact 49N at temperatures at or colder than the selected cold operating temperature of the energy management system; and to close against contact 49E at outdoor temperatures warmer than such selected cold operating temperature. Similarly, the thermally responsive element 50 may be set to close against contact 50N at outdoor temperatures warmer than the selected hot operating temperature of the energy management system; and to close against contact 50E at temperatures cooler than such selected temperature.

For outdoor temperatures beyond the predetermined operating range, contact 49N will be closed for the heating mode, and contacts 49E and 50N will be closed for the cooling mode. Indicator 52 will be energized to show that the HVAC units are being operated in the normal mode of heating or cooling; and the relay 55 will be inoperative, as will relays 60A and 60B. The switches 60A-1 and 60B-1 will be in the illustrated positions. The signals between the room thermostats 32A and 32B and the respective HVAC units 18A and 18B will be made directly between the W1 and W1-M terminals, and the other terminals Y1 and Y1-M etc, for operation of the HVAC units, responding directly to the demand of the room thermostats 32A and 32B.

When the outdoor temperature is within the predetermined operating range, contacts 49E and 50E will both be closed (and contacts 49N and 50N will be open); and the energy management relay 55 and indicator 54 will be energized. This closes the normally open contacts 55A-1 and 55B-1, in the control for the respective zones 10A and 10B; and the energy management system is ready to function. This is indicated by the ambient temperature changeover network block in FIG. 2.

Upon a subsequent demand for conditioned air from either paired zone 10A or 10B, the HVAC unit for the demanding zone will begin to operate, and the lockout means will be activated to bypass the normal operating cycle of the nonoperating paired HVAC unit. This is indicated by the equipment interlock and zone control blocks indicated in FIG. 2.

For added clarity, consider a heating mode scenario, where zone 10A is responding to thermostat 32A; which makes W1 of the thermostat hot. With the selector switch 60B-1 as shown, this begins operation of the HVAC unit 18A, via the now hot terminal W1-M. A circuit is also completed including the selector switch 62A, through now closed ambient temperature contacts 55A-1, and the normally closed contacts 66A-1, 70B-W2, 70B-Y2 and 64B-1 through relay 60A to the common terminal C; to energized the relay 60A. This shifts the switch 60A-1 in the zone B control to the opposite position from that illustrated. The relay 70A-W is also energized at this time, to close the normally open contacts 70A-W1 and make the junction 73A hot, and to open contacts 70A-W2 in the B zone control.

If while the HVAC unit 18A is still operating, a demand arise in the other paired zone 10B, the W1 terminal in thermostat 32B also goes hot. A circuit is thus completed via the W1-E contact of the switch 60A-1 through relay 76B to the common terminal C, to energize the relay 76B. This closes the normally open contacts 76B-1, in the A zone control, between the junction 73A and the hot terminal H; and a hold circuit is then completed from the hot terminal H via the closed contacts 76B-1 and 70A-W1 to the common C, to hold the relay 70A-W energized, independently of the demand in zone 10A and the potential of terminal W1 of thermostat 32A.

With the relay 76B energized, the normally closed relay contacts 76B-2 open and the normally open relay contacts 76B-3 close, in the damper motor control. A circuit is now established through the "auto" contact of switch 80A-1 between the hot terminal R and the W motor terminal, through the closed contacts 76B-3, to drive the damper motor 44A in a direction to open the divert damper 43A and close the primary flow damper 42A.

The shifted valve 40A diverts part of the air flow from the conditioned air supply of zone 10A to the other zone 10B, via secondary diffuser 34B; and reduces or stops the air discharge from primary diffuser 24A-3. This occurs without the HVAC unit 18B for zone 10B being operated. This makes 18A the driving or master unit, and 18B the slave unit.

In this mode, when and if the W2 terminal of the zone thermostat 32A becomes hot, the energized W2-M terminal of the operating HVAC unit 18A will then operate the second stage of heating, providing added heat output to the paired HVAC system.

As illustrated, the relay 66A becomes energized also at this time, and may be set to any adjustable duration, of the order of one to several minutes, to serve as an override of the energy management system. Thus, after a timed duration passes with relay 66A energized, which may be indicitive of a high demand situation where the energy management system might not operate adequately, the timer would be effective to open its relay contacts 66A-1, in the zone A control, to override the energy management system and render it inoperable. This would deenergizes relay 60A, if it were operating, and allows the switch 60A-1 in the zone B control to return to the illustrated position. Thereafter, the HVAC unit 18B for the B zone would operate in its normal mode of heating.

While operating in the energy management mode, because of the energized holding relay 70A-W, the zone A thermostat 32A no longer determines the duration of the heating cycle of the operating HVAC unit 10A; but the thermostat 32B for the second zone 10B must be satisfied, or the paired operation must exceed the timed demand conditions for the overrides, to stop the unit 18A or return it to the control of its thermostat 32A.

When operating in the energy management mode as outlined, if the demand in zone 10B of the nonoperating of slave HVAC unit 18B is satisfied, the W1 terminal of the zone thermostat 32B and the relay 76B are deenergized, thereby opening the contacts 76B-1 and 76B-3 and closing contacts 76B-2, in the zone 10A control. The closed contacts 76B-2 returns the damper valve 40A to its normal position, with air flow then being from the primary diffuser 24A-3 and not from the secondary diffuser 34B. Also, opened contacts 76B-1 deenergizes hold relay 70A-W, to return the operation of the HVAC unit 18A to its thermostat 32A. If the demand in zone 10A is also satisfied, the HVAC unit 18A will stop; and no HVAC unit will then be operating.

If the demand in zone 10B continues and even increases, as by the W2 terminal of the zone thermostat 32B becoming hot, the time delay relay 64B becomes energized. The relay 64B may be set to any adjustable duration, of the order of one to several minutes. After such a timed duration passes, the relay 64B is effective to open its relay contacts 64B-1, in the zone A control; effective to deenergized relay 60A and allow the switch 60A-1 in the zone B control to return to the illustrated position, to terminate the operation of energy management system. Thereafter, the zone B HVAC unit 18B can operate in its normal mode of heating.

Once the W1 terminal of thermostat 32A goes hot to energize relay 70A-W, it becomes a master, relative to the B unit, as its normally closed contacts 70A-W2, in the B zone of control, are opened, to preclude the relay 60B from being energized. This stabilizes the system control, to prevent rapid cycling of the units, such as might otherwise occur, from one master to the other, if while a demand continues in the master zone, the slave zone may also be experiencing cyclic demands.

It is possible that conditions may not be favorable for the complete and exclusive operation of the disclosed energy management system, such as where an excessive heat gain to or drain from one zone may exist relative to the other zone; caused by the sun, by the wind, by opening doors or windows etc. In such a situation, a more permanent override control may be desirable for stability of the system, which override will return the HVAC units to normal operation.

A manual switch may be used to override the energy management system at any time; whereby contacts 92-1 may be opened to render the ambient temperature relay 55 inoperable, and contacts 92-2 may be opened to render the actuator motor 44A (and 44B) inoperable.

While the scenario described a heating mode, and had the HVAC unit 18A initially operating and the zone 10B dependent thereon, it should be apparent that the system will work in the same manner for cooling; or on a first-come first-served basis, where zone 10B may demand first, to operate unit 18B as the master, and zone 10A would then be the slave dependent thereon.

In the energy management mode of operation, between one-third and three-quarters of the air flow from the operating HVAC unit, may be diverted to the zone of the none operating HVAC unit. Thus, the additional supply diffuser 34B (and 34A), associated with each HVAC unit, may provide less pressure drop than the closed primary supply diffuser 24A-3 (and 24B-3).

Within the range of acceptable outside temperatures for the energy management system, the system will reduce short operating cycles, or repetitive rapid cycles of the HVAC units. Also, the operating energy management system precludes the simultaneous start-up of both paired HVAC units of the system, much the same as a load sheading control. These factors should reduce operating and maintenance costs substantially, for a rapid payback of all installation costs. The components are user friendly, and service friendly. The system may be used in new construction, or as a retrofit in an existing multiple-unit, multiple-zone HVAC system. Once installed, it needs little fine tuning and/or recalibration.

While only a single operating system is disclosed, with specific controls, it will be apparant that variations may be made therefrom without departing from the inventive concept. Accordingly, the invention should be measured only by the scope of the following claims.

What is claimed as my invention is:

1. An energy management system for use with two HVAC units for conditioning two interconnected zones, each zone having first and second supply diffusers for discharging conditioned air from the respective HVAC unit and a return diffuser for returning air back to such HVAC unit; and stat means in each zone signaling a demand for conditioned air and for operating the HVAC unit for such zone; the improved combination of
   the separate zones and the respective HVAC units, being paired, including having an additional supply air diffuser in each zone, and means connecting such additional diffuser in each zone with the HVAC unit for the other zone;
   valve means connected between each HVAC unit and the additional diffuser in the other zone, for selectively opening and closing air flow of such HVAC unit to the other zone;
   means for locking out the operation of the HVAC for the other zone, responsive to the stat means signaling a demand in the first of either paired zone and thereby operating the HVAC unit for such first zone; and
   means for opening the valve means of the operating HVAC unit of the first zone for diverting some of the conditioned air flow from such unit to the other zone, responsive to the stat means signaling a subsequent but concurrent demand for conditioned air in the other zone.

2. An energy management system as claimed in claim 1, further including thermostat means to sense the outside ambient temperature, and a control operable when such outside ambient temperature is outside of a specific temperature range to render the energy management system inoperable.

3. An energy management system as claimed in claim 1, further including
   a second valve means connected between each HVAC unit and the second supply diffuser in its zone, for selectively opening and closing such second diffuser;
   said first-mentioned valve means and said second valve means being operated concurrently but oppositely, with one being opened while the other is being closed, and vice-versa.

4. An energy management system as claimed in claim 1, further including the combination that the open first valve means of the operating HVAC unit diverts between approximately one-third and three-quarters of the conditioned air from such unit to the other zone, for discharge from such additional diffuser in the other zone.

5. An energy management system as claimed in claim 4, further including thermostat means to sense the outside ambient temperature, and a control operable when such outside ambient temperature is outside of a specific temperature range to render the energy management system inoperable.

6. An energy management system as claimed in claim 5, further wherein said thermostat means is set to sense an outside ambient temperature range approximately midway between the average of a selected comfort temperature, and the low end heating and high end cooling design temperature of the HVAC units.

7. An energy management system as claimed in claim 2, further including
   a second valve means connected between each HVAC unit and the second supply diffuser in its zone, for selectively opening and closing such second diffuser;
   said first-mentioned valve means and said second valve means being operated concurrently, but oppositely, with one being opened while the other is being closed, and vice-versa.

8. An energy management system as claimed in claim 7, further wherein the additional supply diffuser associated with each HVAC unit, provide less pressure drop than the closed primary supply diffuser, whereby approximately equal or even greater amounts of air flow is diverted to the second zone than is continued to the first zone.

9. An energy management system as claimed in claim 8, further including the combination that the opened first valve means of the operating HVAC unit diverts between approximately between one-third and three-quarters of the conditioned air from such unit to the other zone, for discharge from such additional diffuser in the other zone.

10. An energy management system as claimed in claim 7, further including a time delay control operable once initially activated, to function after a specific duration has lapsed; means responsive to a subsequent but concurrent demand for conditioned air in the other zone, for initially activating said time delay control; and said time delay control being operable after the timed duration having lapsed to function to render the energy management system inoperable.

11. An energy management system for use with two HVAC units for conditioning two interconnected zones, each zone having first and second supply diffusers for discharging conditioned air from the respective HVAC unit and a return diffuser for returning air back to such HVAC unit; and stat means in each zone signaling a demand for conditioned air and for operating the HVAC unit for such zone; the improved combination of the separate zones and the respective HVAC unit, being paired, including having an additional supply air diffuser in each zone, and means connecting such additional diffuser in each zone with the HVAC unit for the other zone;

thermostat means to sense the outside ambient temperature, and a control operable when such outside ambient temperature is outside of a specific temperature range to render the energy management system inoperable;

first valve means connected between each HVAC unit and the additional diffuser in the other zone, for selectively opening and closing air flow from such HVAC unit to the other zone;

second valve means connected between each HVAC unit and the second supply diffuser in its zone, for selectively opening and closing such second diffuser;

means for locking out the operation of the HVAC for the other zone, responsive to the thermostat means signaling a demand in the first of either paired zone and for operating the HVAC unit for such first zone; and means for opening the first valve means of the operating HVAC unit of the first zone for diverting some of the conditioned air flow from such unit to the other zone, and for closing the second valve means of the operating HVAC unit of the first zone for reducing conditioned air flow from such unit to its zone, responsive to the subsequent but concurrent demand for conditioned air in the other zone.

12. An energy management system as claimed in claim 11, further including the combination that the open first valve means of the operating HVAC unit diverts between approximately one-third and three-quarters of the conditioned air from such unit to the other zone, for discharge from such additional diffuser in the other zone.

* * * * *